United States Patent [19]

Iannicelli

[11] E Re. 30,699

[45] Reissued Aug. 4, 1981

[54] POLYURETHANES CONTAINING AMINO ORGANOSILANE MODIFIED CLAY

[75] Inventor: Joseph Iannicelli, Macon, Ga.

[73] Assignee: J. M. Huber Corporation, Locust, N.J.

[21] Appl. No.: 26,381

[22] Filed: Apr. 2, 1979

Related U.S. Patent Documents

Reissue of:

[64] Patent No.: 3,390,120
Issued: Jun. 25, 1968
Appl. No.: 480,090
Filed: Aug. 16, 1965

U.S. Applications:

[63] Continuation-in-part of Ser. No. 269,695, Apr. 1, 1963.

[51] Int. Cl.[3] ..... C08L 75/04

[52] U.S. Cl. ..... 260/37 N; 260/40 TN

[58] Field of Search ..... 260/37 N, 40 TN; 106/308 N

[56] References Cited

U.S. PATENT DOCUMENTS

| | | | |
|---|---|---|---|
| 2,742,378 | 4/1956 | TeGrotenhuis | 106/308 |
| 2,832,754 | 4/1958 | Jex et al. | 528/38 |
| 3,015,569 | 1/1962 | Frieser | 106/26 |
| 3,029,209 | 4/1962 | Ferrigno | 521/76 |
| 3,150,109 | 9/1964 | Ferrigno | 521/129 |
| 3,158,519 | 11/1964 | Shannon et al. | 156/180 |
| 3,168,389 | 2/1965 | Eilerman | 65/3 |
| 3,227,675 | 1/1966 | Papalos | 260/42.15 |
| 3,328,339 | 6/1967 | Tierney | 260/37 |
| 3,350,345 | 10/1967 | Vanderbilt et al. | 260/42.15 |
| 3,364,050 | 1/1968 | Marzocchi | 427/290 |
| 3,388,144 | 6/1968 | Musolf et al. | 260/448.8 |
| 3,392,182 | 7/1968 | Koerner | 260/448.8 |
| 3,419,517 | 12/1968 | Hedrick et al. | 260/37 |

FOREIGN PATENT DOCUMENTS

| | | |
|---|---|---|
| 689318 | 6/1964 | Canada . |
| 948163 | 1/1964 | United Kingdom . |

OTHER PUBLICATIONS

Jellinek et al., Silane Finishes for Fibrous Glass, 1957, Presentation before the Society of Plastic Industries, Union Carbide Corp.

*Primary Examiner*—Lewis T. Jacobs
*Attorney, Agent, or Firm*—Robert L. Price; Harold H. Price

[57] ABSTRACT

The instant disclosure is directed to the polyurethane polymer compositions which are filled with a kaolin clay which has been modified with from 1% to 3% of an amino organosilane. The modulus and tear resistance of the polymers is improved without degradation of the remaining properties.

4 Claims, No Drawings

POLYURETHANES CONTAINING AMINO ORGANOSILANE MODIFIED CLAY

Matter enclosed in heavy brackets [ ] appears in the original patent but forms no part of this reissue specification; matter printed in italics indicates the additions made by reissue.

This invention relates to polyurethane polymer compositions containing finely divided amino organosilane modified kaolin clay fillers.

The present application is a continuation-in-part of applicant's copending application Ser. No. 269,695, filed Apr. 1, 1963, now Patent No. 3,290,165, entitled, "Surface Modified Pigments," which in turn is a continuation-in-part of applicant's application Ser. No. 189,321, filed Apr. 23, 1962, entitled, "Surface Modified Pigments," now abandoned.

Polyurethane polymer compositions can be formed from a variety of polymers, i.e., thermosetting gums, thermoplastic polymers and liquid or casting polymers. The preparations for various classes and grades of polyurethanes are well known in the art and need not be detailed here; however, the general reaction by which they are formed is by a chain extension process rather than the usual polymerization reaction. In this process a relatively short chain polymer, either a polyester or a polyether, is reacted with an organic diisocyanate to form long chain urethane polymer. The process variations and polymerization variations caused thereby result in a multitude of compositions all broadly falling in one of the three classes mentioned.

The polyurethanes have several outstanding properties which make them desirable products, chief among them is abrasion resistance, good low temperature characteristics, good resistance to heat deterioration, ozone cracking, weathering, and oil or solvent swelling.

Thermosetting gum vulcanizates have a variety of uses in conveyor belts, roll covers, sandblast-hose tubes and other applications where good abrasion resistance is needed.

Thermoplastic resins can be processed on standard extrusion, injection molding, and transfer molding equipment. These resins are useful in small parts such as mallet heads, sprocket gears, adhesive coatings and unsupported sheetings such as fuel tanks, tarpaulins and chute liners.

Liquid polyurethane valcanizates exhibit good abrasion resistance, non-marking and a wide range of hardnesses. These products have use in large rolls for the steel industry, fork lift truck wheels, ladies toplifts, ball-joint seals, automotive seals, potting compounds, conveyor belts, V-belts, and tank linings.

Despite the fact that the polyurethanes have outstanding properties and are suitable for a large variety of uses, industry is constantly attempting to improve them by various means. Properties which are desirable to improve are modulus, tear resistance, hardness and abrasion resistance. In many cases reinforcing fillers have been tried but on the whole, while some improvements resulted, the degradation of other properties resulted and a completely satisfactory filler has not been found.

It is an object of this invention to provide solid polyprethane vulcanizates and thermoplastic resin compositions containing reinforcing fillers of modified kaolin clays.

Other objects and advantages will be apparent from the following specification.

I have discovered that kaolin clay modified with saturated amino organosilanes are reinforcing fillers for polyurethane polymers and impart improved properties to them. Particularly, modulus and tear resistance are improved with little, if any, degradation of other important properties.

The kaoline clays which are suitable as substrates for the modifier are refined clays of the rubber and paper grades.

The modified kaolin clays can be prepared by dissolving the desired amount of amino organosilane in a suitable solvent, adding the pigment and heating until the reaction is complete. The amount of modifier added depends upon the specific modifier used and the intended polymer to be reinforced. Generally from 1% to 3% by weight of the modifier is sufficient for most purposes.

A particularly useful process for modifying the kaolin clay involves spray drying kaolin slurries having one or more of the amino organosilanes dispersed therein. The spray drying process effects a uniform distribution of the modifier on the kaolin. Another satisfactory method of modifying the kaolin involves dissolving the desired amount of amino organosilane in a suitable solvent, adding the kaolin and heating until the reaction is complete.

The compounds used to modify the kaolin clays can be depicted by the formula:

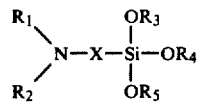

wherein $R_1$ is hydrogen, alkyl, aryl, cycloalkyl, or alkylaryl; $R_2$ is hydrogen, alkyl, aryl, cycloalkyl, or alkylaryl; $R_3$ is hydrogen, lower alkyl, aryl, lower alkylaryl, or lower arylalkyl; $R_4$ is hydrogen, lower alkyl, aryl, lower alkylaryl, or lower arylalkyl; $R_5$ is hydrogen, lower alkyl, aryl, lower alkylaryl, or lower arylalkyl; and X is alkylene, alkylene containing secondary amino nitrogen, alkylene containing tertiary amino nitrogen, arylene, arylene containing secondary amino nitrogen, arylene containing tertiary amino nitrogen, alkylarylene, alkylarylene containing secondary amino nitrogen, alkylarylene containing tertiary amino nitrogen, arylalkylene, arylalkylene containing secondary amino nitrogen, arylalkylene containing tertiary amino nitrogen, cycloalkylene, cycloalkylene containing secondary amino nitrogen and cycloalkylene containing tertiary amino nitrogen. Some of these amino organosilanes are disclosed along with methods for their preparation in U.S. Patents Nos. 2,832,754, 2,930,809, 3,007,957, and 3,020,302. Commercially available amino organo silanes useful in the practice of this invention include "A-1100," a gamma-aminopropyltriethoxy silane (GAPTS), and "Y-2967," an amino organosilane which is a modified gamma-aminopropyltriethoxy silane, sold by Union Carbide Corporation, New York, N.Y., "Z-6020," a diamino functional silane, sold by Dow Corning Corporation, Midland, Michigan.

Representative commercially available polyurethane polymers suitable for use in this invention are "Vibrathane 5003," a thermosetting gum which is cross-linked, produced by Naugatuck Chemical Division of U.S.

Rubber Company; "Elastothane 455," a thermosetting gum which is cross-linked, produced by Thiokol; "Genthane S," a cross-linked thermosetting gum produced by General Chemical; "Estane," a thermoplastic resin produced by B. F. Goodrich Chemical; "Texin," a thermoplastic resin produced by Mobay; "Multrathane," a liquid polymer produced by Mobay; "Cyanoprene 4590," a liquid polymer produced by American Cyanamid; "Adiprene L," produced by Du Pont; "Vibrathane 6000," produced by Naugatuck; and "Neothane," produced by Goodyear.

In the following formulations the gums were mill-mixed or Banbury-mixed and the thermoplastic resins were mill-mixed and injection molded.

The following formulations illustrate this invention.

Example I

| | Parts |
|---|---|
| Vibrathane 5003 | 100 |
| Stearic acid | 0.25 |
| Dicup 40C (polymerizing agent) | 5 |
| Filler (modified clay) | 60 |

The compounds were mixed on a 6 inch by 12 inch laboratory mill and cured for 30 minutes at 307° F., except for the NBS abrasion test where the cure was for 60 minutes at 307° F.

The data tabulated in Table I indicates the results when 1%, 2% and 3% by weight of GAPTS modified kaolin clay and 1% by weight Silicone Z-6020 modified kaolin clay is the filler.

TABLE I

| | Control | Kaolin | 1% GAPTS on Kaolin | 2% GAPTS on Kaolin | 3% GAPTS on Kaolin | 1% Z-6020 on Kaolin |
|---|---|---|---|---|---|---|
| Parts Filler/100 parts Polymer | None | 60 | 60 | 60 | 60 | 60 |
| Tensile, p.s.i. | 3,500 | ([1]) | 3,920 | 3,600 | 3,840 | 3,270 |
| Stress 300%, p.s.i. | 1,040 | ([1]) | 2,600 | 3,390 | — | 2,520 |
| Elongation, percent | 440 | ([1]) | 470 | 350 | 265 | 365 |
| Shore A Hardness | 58 | — | 74 | 74 | 74 | 73 |
| NBS Abrasion, percent of Standard | 100 | — | 89 | 134 | 157 | 193 |
| Minutes Cured at 305° F. | 30 | 30 | 30 | 30 | 30 | 60 |

[1]No cure.

Example II

| | Parts |
|---|---|
| Texin 480A | 100 |
| Modified clay | 20 |

The resin was molded at 390°–410° F. and post cured at 110° C. for 24 hrs. The results are tabulated in Table II.

TABLE II

| | Control | Kaolin | 1% GAPTS on Kaolin |
|---|---|---|---|
| Parts Filler/100 parts Polymer | None | 20 | 20 |
| Stress 300%, p.s.i. | 1,720 | 2,170 | 2,430 |
| Tensile, p.s.i. | 5,700 | 2,540 | 2,620 |
| Elongation, percent | 640 | 510 | 400 |
| Shore A Hardness | 75 | 78 | 78 |
| NBS Abrasion, percent of Standard | 100 | 77 | 92.5 |

Example III

| | Parts |
|---|---|
| Texin 480A | 100 |
| Modified clay | 20 |

The resin was molded at 390°–410° F. and was not post cured. The results are shown in Table III.

TABLE III

| | Control | Kaolin | 0.25% GAPTS on Kaolin | 0.5% GAPTS on Kaolin | 1% GAPTS on Kaolin |
|---|---|---|---|---|---|
| Parts Filler/100 parts Polymer | 0 | 20 | 20 | 20 | 20 |
| Stress 300%, p.s.i. | 1,090 | 1,680 | 1,725 | 1,735 | 1,720 |
| Tensile, p.s.i. | 4,380 | 4,470 | 3,340 | 4,250 | 4,400 |
| Elongation, percent | 610 | 640 | 560 | 655 | 595 |
| Shore A Hardness | 85 | 88 | 88 | 88 | 88 |

Example IV

| | Parts |
|---|---|
| Estane 5701 | 100 |
| Barium stearate | 3 |
| Modified clay | 25 or 50 |

The resin was molded 5' at 350° F. held in the mold under pressure until the temperature dropped below 200° F. The results are tabulated in Table IV.

TABLE IV

| | Control | Kaolin | | Kaolin plus 1% Z 6020 | |
|---|---|---|---|---|---|
| Parts Filler/100 parts Polymer | 0 | 25 | 50 | 25 | 50 |
| 300% Modulus, p.s.i. | 1,220 | 1,580 | 1,640 | 2,840 | 3,300 |
| ASTM Test "Die" C, lbs./in | 410 | 500 | 300 | 560 | 580 |
| NBS Abrasion Index, percent | 492 | 521 | 720 | 1,285 | 16.72 |
| NBS Abrasion Shore A | 82 | 90 | 92 | 90 | 92 |

Example V

| | Parts |
|---|---|
| Estane 5701 | 100 |
| Barium stearate | 3 |
| Filler | 25, 50 or 100 |

The polymer batch was treated as in Example IV. The results are shown in Table V.

TABLE V

| | Control | Kaolin | Kaolin plus 2% GAPTS | Kaolin plus 2% GAPTS | Kaolin plus 3% GAPTS | Kaolin plus 1% Z 6020 | Kaolin | Kaolin plus 2% GAPTS | Kaolin plus 1% Z 6020 | Kaolin | Kaolin plus 2% GAPTS | Kaolin plus 1% Z 6020 |
|---|---|---|---|---|---|---|---|---|---|---|---|---|
| Parts Filler/100 parts Polymer | 0 | 25 | 25 | 25 | 25 | 25 | 50 | 50 | 50 | 100 | 100 | 100 |
| 200% Modulus, p.s.i. | 860 | — | — | — | — | — | 1,700 | 3,500 | 3,740 | — | — | — |
| 300% Modulus, p.s.i. | 1,440 | 1,780 | 2,940 | 3,260 | 3,040 | 3,000 | — | — | — | — | — | — |
| Shore A Hardness | 88 | 93 | 91 | 92 | 91 | 91 | 94 | 94 | 95 | 97 | 97 | 97 |
| NBS Abrasion, Index | 460 | 641 | 827 | 703 | 641 | 746 | 624 | 936 | 568 | 334 | 553 | 575 |

Example VI

| | Parts |
|---|---|
| Estane 5701 | 100 |
| Barium Stearate | 3 |
| Pigment | 25 or 50 |

The recipe was treated the same as in Example IV. The results are shown in Table VI.

TABLE VI

| | Control | Kaolin | Kaolin plus 2% GAPTS | | | Kaolin plus 1% Z-6020 | |
|---|---|---|---|---|---|---|---|
| Parts Filler/100 parts Polymer | None | 25 | 50 | 25 | 50 | 25 | 50 |
| 300% Modulus, p.s.i. | 1,220 | 1,580 | 1,640 | 2,880 | 3,600 | 2,840 | 3,300 |
| ASTM Tear "Die C," lbs./in | 410 | 500 | 500 | 550 | 480 | 560 | 580 |
| NBS Abrasion, Index percent | 492 | 521 | 720 | 1,015 | 1,411 | 1,285 | 1,672 |
| NBS Abrasion, Shore A Hardness | 82 | 90 | 92 | 90 | 91 | 90 | 92 |

Example VII

| | Parts |
|---|---|
| Estane 5701 | 100 |
| Barium Stearate | 3 |
| Filler | 10, 20, 60 or 100 |

The recipe was treated as in Example IV. The results are shown in Table VII.

TABLE VII

| | Control | Kaolin Plus 1% Z-6020 | | Kaolin | Kaolin Plus 1% Z-6020 | | Kaolin |
|---|---|---|---|---|---|---|---|
| Parts Filler/100 parts Polymer | 0 | 10 | 20 | 20 | 60 | 100 | 100 |
| 300% Modulus, p.s.i. | 1,280 | 2,040 | 2,740 | 1,640 | 3,420 | — | 2,040 |
| ASTM Tear "Die C," lbs./in | 420 | 500 | 600 | 530 | 540 | 406 | 510 |
| NBS Abrasion, Index percent | 570 | 867 | 1,095 | 957 | 1,722 | 1,465 | 717 |
| NBS Abrasion, Shore A | 84 | 85 | 89 | 89 | 94 | 95 | 95 |

Example VIII

| | Parts |
|---|---|
| Adiprene L-100 | 100 |
| Methylene-bis-orthochloraniline | 11 |
| Pigment | 20 |

The mixture was cured for 180 minutes at 212° F. The results are shown in Table VIII.

TABLE VIII

| | Control | Kaolin | Kaolin Plus 1% Z-6020 |
|---|---|---|---|
| Parts Filler/100 parts Polymer | 0 | 20 | 20 |
| 300% Modulus, p.s.i. | 1,530 | — | 1,940 |
| Tensile, p.s.i. | 2,570 | 1,310 | 2,710 |
| Elongation, Percent | 495 | 285 | 480 |
| Shore A Hardness | 87 | 88 | 90 |
| ASTM Tear "Die C," lbs./in | 450 | 408 | 505 |
| NBS Abrasion, Index Percent | 224 | 126 | 194 |

The examples and data indicate that when the modified kaolin clays useful in this invention are used as fillers in thermosetting gum polyurethanes increases in modulus, hardness and abrasion resistance occur. The remaining properties of the polymer remain within acceptable levels. When these fillers are used to reinforce thermoplastic resins, increases in modulus, tear resistance, and abrasion resistance occur while the remaining polymer properties remain within acceptable levels. When these modified kaolin clay fillers are used to reinforce liquid polymers, increases in modulus, tensile strength, hardness, and tear resistance occur while the remaining properties of the polyurethane remain within acceptable levels. In all the polymers tested the general level of performance of the modified kaolins was superior to the unmodified kaolins.

The foregoing is illustrative only and additional modifications may be made without departing from the substance of the invention as defined in the appended claims.

I claim:

1. A polyurethane polymer composition containing as a filler, modified kaolin clay, said kaolin clay *having been* modified *by treatment* with from 1% to 3% by weight with an aminoorganosilane of the formula

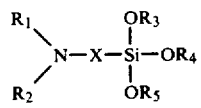

wherein $R_1$ is selected from the group consisting of hydrogen, alkyl, aryl, cycloalkyl, and alkaryl, $R_2$ is selected from the group consisting of hydrogen, alkyl, aryl, cycloalkyl, and alkylaryl, $R_3$ is selected from the group consisting of hydrogen, lower alkyl, aryl, lower alkylaryl, and lower arylalkyl, $R_4$ is selected from the group consisting of hydrogen, lower alkyl, aryl, lower alkylaryl, and lower arylalkyl, $R_5$ is selected from the group consisting of hydrogen, lower alkyl, aryl, lower alkylaryl, and lower arylalkyl, and X is selected from the group consisting of alkylene, arylene, alkylarylene, arylalkylene, cycloalkylene, cycloalkylene containing secondary amino nitrogen and cycloalkylene containing tertiary amino nitrogen, *the modification of said kaolin clay being carried out by spray drying kaolin slurries having one or more of said amonoorganosilanes dispersed therein, said spray drying effecting a uniform distribution of said aminoorganosilane on the kaolin.*

2. The composition of claim 1 wherein the filler is kaolin clay modified with from 1% to 3% by weight of a diamino functional silane.

3. The composition of claim 1 wherein the filler is kaolin clay modified with 1% to 3% by weight of gamma-aminopropyltriethoxysilane.

*4. A polyurethane polymer composition containing as a filler, modified kaolin clay, said kaolin clay having been modified by treatment with from 1% to 3% by weight of an aminoorganosilane of the formula:*

$$H_2N—R—Si—(OR')_3$$

*wherein R is selected from the group consisting of phenylene, lower alkyl substituted phenylene, lower alkoxy substituted phenylene, and lower alkylene, R' is a monovalent hydrocarbon group free of aliphatic unsaturation selected from the group consisting of lower alkyl, aryl, lower alkaryl and lower aralkyl, and wherein R' can represent the same or different groups.*

* * * * *